United States Patent [19]
Cane et al.

[11] Patent Number: 5,940,507
[45] Date of Patent: Aug. 17, 1999

[54] SECURE FILE ARCHIVE THROUGH ENCRYPTION KEY MANAGEMENT

[75] Inventors: David Cane, Sudbury; David Hirschman, Sharon; Philip Speare, Arlington; Lev Vaitzblit, Concord, all of Mass.

[73] Assignee: Connected Corporation, Framingham, Mass.

[21] Appl. No.: 09/014,830

[22] Filed: Jan. 28, 1998

Related U.S. Application Data

[60] Provisional application No. 60/037,597, Feb. 11, 1997.
[51] Int. Cl.⁶ .................................................... H04L 9/00
[52] U.S. Cl. .................................. 380/4; 380/21; 380/49
[58] Field of Search ................................ 380/4, 21, 49; 707/204; 711/161, 162; 395/186, 187.01; 713/200, 201

[56] References Cited

U.S. PATENT DOCUMENTS

| | | | |
|---|---|---|---|
| 5,235,641 | 8/1993 | Nozawa et al. | 380/21 |
| 5,416,840 | 5/1995 | Cane et al. | 380/4 |
| 5,479,654 | 12/1995 | Squibb | 395/600 |
| 5,559,991 | 9/1996 | Kanfi | 395/489 |
| 5,584,022 | 12/1996 | Kikuchi et al. | 380/21 X |
| 5,719,938 | 2/1998 | Haas et al. | 380/21 |
| 5,721,777 | 2/1998 | Blaze | 380/4 |
| 5,748,735 | 5/1998 | Ganesan | 380/21 |
| 5,764,972 | 6/1998 | Crouse et al. | 395/601 |

OTHER PUBLICATIONS

Bruce Schneier, "Applied Cryptography: Protocols, Algorithms, and Source Code in C", 2nd edition John Wiley and Sons, N.Y. (1995) p. 51 (Key and Message Transmission).

*Primary Examiner*—Pinchus M. Laufer
*Attorney, Agent, or Firm*—Weingarten, Schurgin, Gagnebin & Hayes LLP

[57] ABSTRACT

A information processing system providing archive/backup support with privacy assurances by encrypting data stored thereby. Data generated on a source system is encrypted, the key used thereby is separately encrypted, and both the encrypted data and encrypted key are transmitted to and maintained by a data repository system. The repository system receives only the encrypted data and key, while the source system retains the ability to recover the key and in turn, the data. The source system is therefore assured of privacy and integrity of the archived data by retaining access control yet is relieved of the physical management of the warehousing medium.

24 Claims, 3 Drawing Sheets

SECURE FILE ARCHIVE THROUGH ENCRYPTION KEY MANAGEMENT

CROSS REFERENCE TO RELATED APPLICATIONS

A claim of priority is made to U.S. Provisional Patent Application No. 60/037,597, entitled FILE COMPARISON FOR DATA BACKUP AND FILE SYNCHRONIZATION, filed Feb. 11, 1997.

STATEMENT REGARDING FEDERALLY SPONSORED RESEARCH OR DEVELOPMENT

Not Applicable

FIELD OF THE INVENTION

The present invention relates to data archive operations for information processing systems, and more particularly to security features for such operations.

BACKGROUND OF THE INVENTION

In an information processing system periodic archival of static, unused objects is desirable to optimize access to more active items and to guard against failure such as disk head crashes and human error such as accidental deletions. Consequently, periodic backups to magnetic tape and corresponding purging of selected files from online disks is a common practice.

Data archival mechanisms need to assure the integrity of data stored thereby. Users of the data need to know data is persistent, and also that there is a reasonable turnaround time for retrieval. Often this entails copying such data entities, hereinafter files, to an inexpensive, high volume, but not necessarily fast access, form of physical storage such as magnetic tape. Corresponding index information regarding the magnetic tape location of a particular file can be retained online. Since index information referencing a file consumes much less storage than the file itself, such information is not as unwieldy as the actual data file counterpart. In order to retrieve a file, the index is consulted to determine the physical volume of the corresponding file. The physical magnetic tape volume is then searched for the desired entity. Although sequential, this aspect of the search can be performed within a reasonable time since the indexing system has narrowed the field to a single volume. Such indexing schemes are numerous and are well known to those skilled in the art.

Images written to magnetic tape, however, remain fixed and readable unless physically overwritten. Successive revisions of backups tend to render the previous versions obsolete, although the earlier versions still exist on the tape. Such a tape might well be discarded, thereby placing it in the public domain, or partially used for another purpose, leaving an uncertain status of the information which may exist randomly and unprotected. Further attenuation of control over the data occurs when another party performs the archive. Since the archiving operation usually bears little relation to the generation of the data, it is often desirable to delegate this operation. The archive operation may be undertaken by a co-located group, a group at a remote location of the same organization, or an external contractor, and could involve either electronic or physical mediums of data transmission. Delegation of the backup operation to an archive server, however, raises issues of security and privacy, since the corporation or individual generating the data (hereinafter source organization) has little control over access to the data at a remote facility. With regard to file deletion, however, magnetic tape does not lend itself well to selective rewrite. Due to the sequential nature of magnetic tape, intra-tape modifications can compromise subsequent files. It is therefore difficult for an archive service to ensure integrity of data upon retrieval requests, provide effective deletion of obsolete data, and maintain secrecy of data while under the control of the archive mechanism.

BRIEF SUMMARY OF THE INVENTION

The present invention addresses the problem of privacy for archived data by providing the source organization with control over the data without burdening the reliability of retrieval with the problems caused by sequential overwrite. An encryption function applied to the archived data renders it in a form unintelligible to unauthorized observers. Encryption involves arithmetic manipulations of the data using a specific value called a key, which renders the data in an unintelligible form. This key bears a specific mathematical relationship to the data and the encryption algorithm being used. Returning the data to the original form involves applying the corresponding inverse function to the encrypted form. Without the proper key, however, it is very difficult to determine the inverse, or decryption, function. The security provided by encryption rests on the premise that with a sufficiently large key, substantial computational resources are required to determine the original data. Encrypting a file with a particular key, and then encrypting the key itself using a master key, therefore, allows another party to physically maintain and store the data while the originator, or source, of the data retains access control. Additional security and authentication measures can also be taken, such as further encrypting the key or the data at the server with a server key, and the use of cipher block chaining to impose dependencies among a sequence of file blocks.

In accordance with the present invention, an archive server utilizes encryption techniques to maintain both security and integrity of stored data by maintaining a series of keys for each archived file, and encrypting both the archived file, and the key to which it corresponds. The archive server manages the encrypted files and the corresponding encrypted keys, while the source organization maintains only the master key required to recover the individual encrypted keys. Through this arrangement, the source organization maintains control and assurances over access to the archived data, while the archive server manages the physical storage medium and performs individual encrypted file manipulation requests at the behest of the client. The archive server maintains access only to the encrypted data files and encrypted keys, effectively managing these files and keys as abstract black-box entities, without the ability to examine and interpret the contents.

Three common transactions involving archived encrypted files are effected by the present invention. A source organization desiring to archive files periodically transfers files from its online repository, usually a fast access storage medium such as a disk, to the archive server. To retrieve archived information, a retrieval transaction indicating a particular file occurs. Finally, when an item is to be deleted, a deletion instruction implicating a particular file is issued to the archive server.

One benefit provided by this arrangement is the elimination of access to data by the archive server, therefore providing the source organization with assurances of access control and privacy, while relieving the source organization of archive cataloging and physical storage duties.

Furthermore, effective deletion of information stored on archive tapes is achieved without physical modification to magnetic tape, therefore avoiding compromise to subsequent data on the same volume.

BRIEF DESCRIPTION OF THE SEVERAL VIEWS OF THE DRAWING

The invention will be more fully understood in view of the following Detailed Description of the Invention and Drawing, of which.

DETAILED DESCRIPTION OF THE INVENTION

U.S. Provisional Patent Application No. 60/037,597 entitled FILE COMPARISON FOR DATA BACKUP AND FILE SYNCHRONIZATION, filed Feb. 11, 1997, is incorporated herein by reference.

Figure 1:
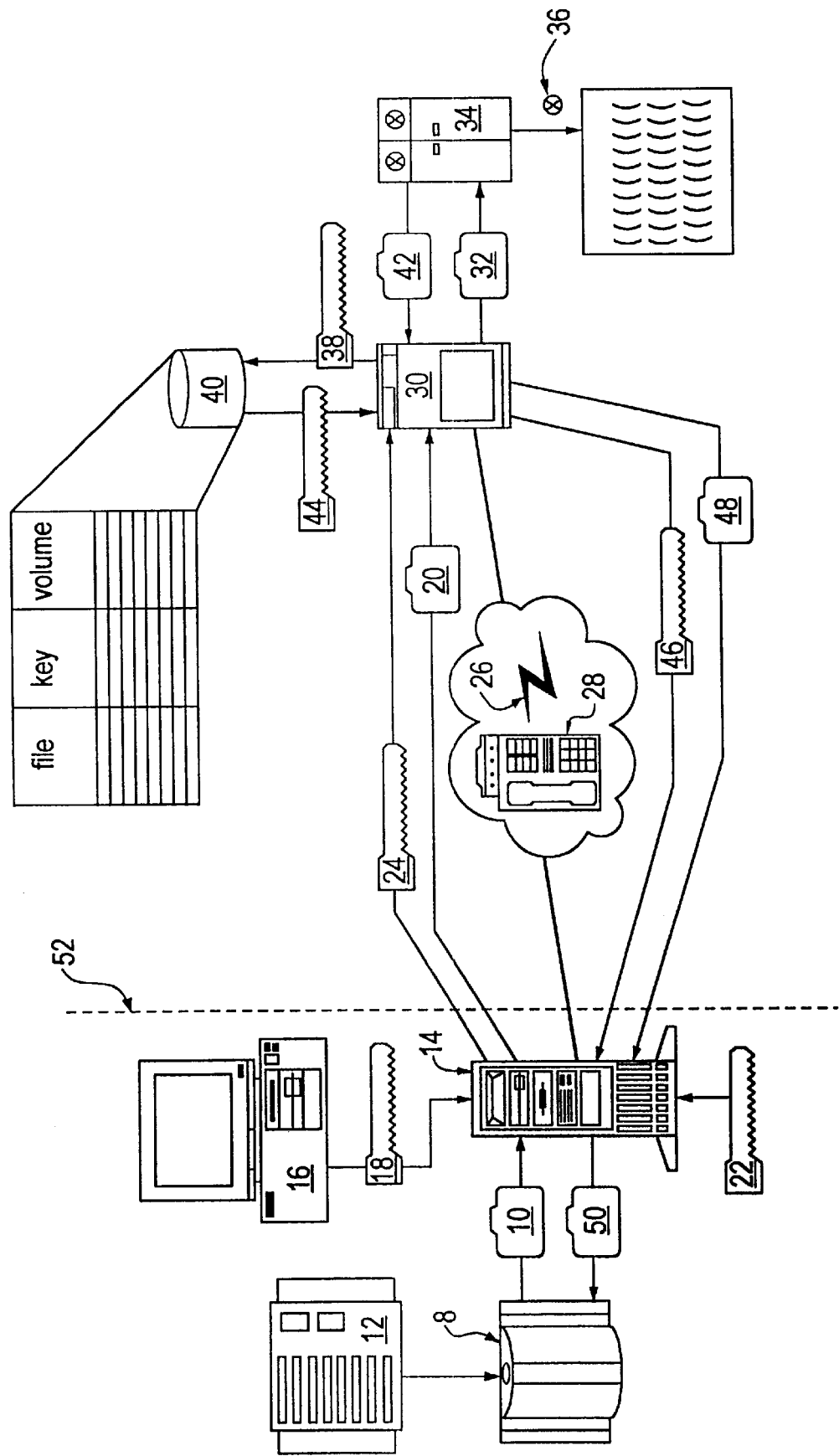
FIG. 1 is a block diagram of the physical information flow.

Referring to FIG. 1, in a computer information processing system large amounts of data are stored and must periodically be archived. Often data is copied from a source system 8 to an archive information processing system 30, hereinafter archive server, over a transmission medium, 26 & 28. The archive server 30 then copies the data to be archived onto a suitable long term storage volume such as magnetic tape 36.

An archive transaction for a file stored at the source system encompasses encryption of the file on the source system using a secondary key, encryption of the secondary key on the source system using a master key, and transmission of the encrypted file and the associated encrypted key to the archive server. Transmission is electronic via computer network, or in alternative embodiments by physical delivery of a suitable magnetic medium. The archive server then stores the encrypted file on magnetic tape or another medium of long term storage, and stores the encrypted key along with an index to the tape containing the encrypted file. The master key used to encrypt the secondary key is retained on the source system.

Figure 2:
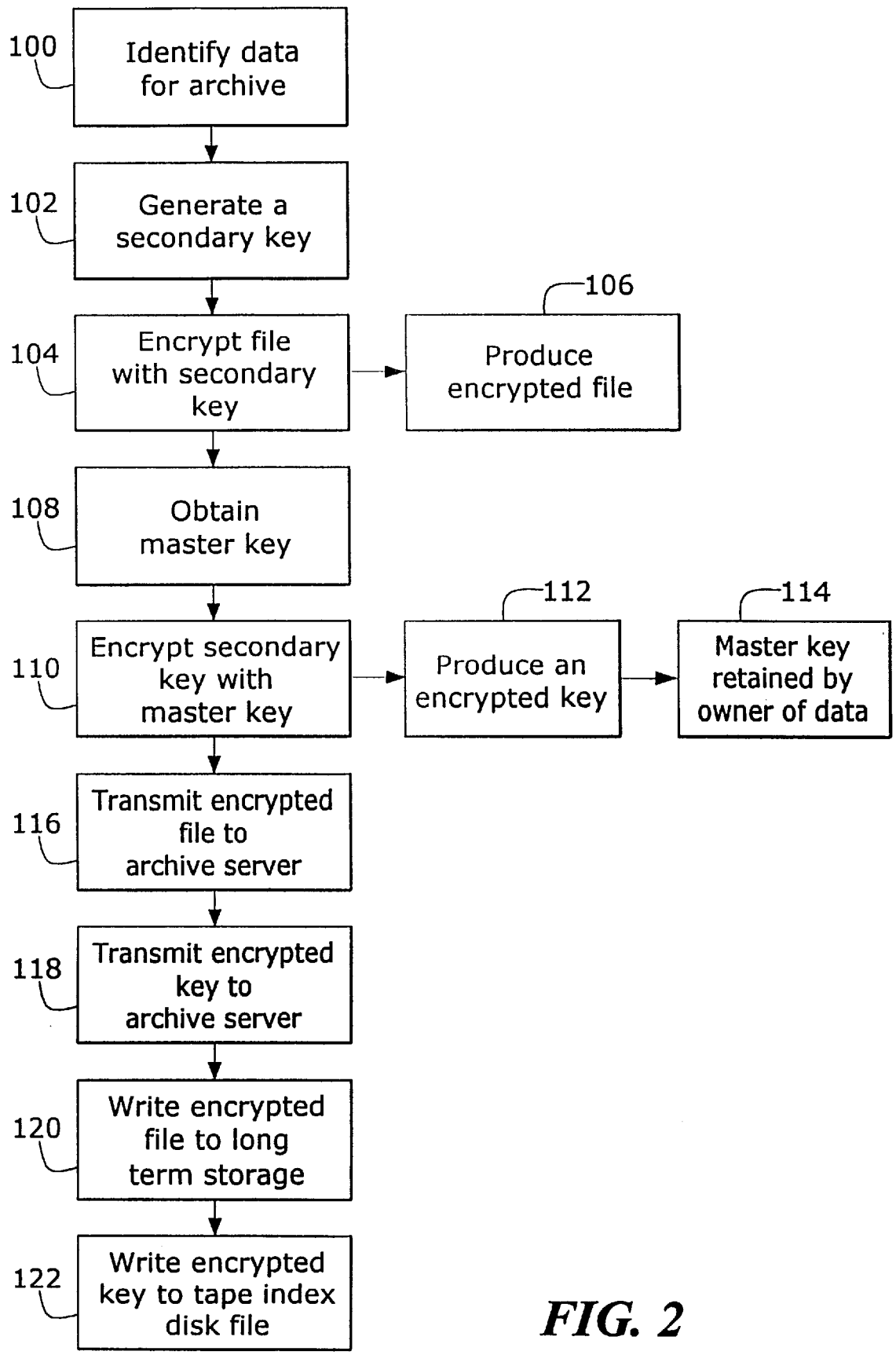
FIG. 2 is a flowchart depicting the archival method.

Referring to FIGS. 1 and 2, A file 10 to be archived is identified 100 within a fast access storage medium 12 of the source information system 8, and is sent to a cryptographic engine 14. The present embodiment incorporates a disk drive as the fast access storage medium, although an alternative embodiment could use other modes of digital fixation, such as CD-ROM. The cryptographic engine 14 may be an application within the same node or an independent CPU, and may invoke specialized encryption hardware, depending on the encryption method desired. Any of various known encryption methods could be employed.

A key generator 16 then generates a secondary key 18 as shown in step 102, and uses this key to encrypt the file 10 as shown in step 104 to produce an encrypted file 20, at step 106. The master encryption key 22 is then obtained in step 108 and used to encrypt the secondary key in 18, as shown at step 110, and produce an encrypted key 24, as indicated in step 112. Note that since the same master key is used to encrypt multiple secondary keys it need be generated only once and then reused for successive secondary keys. The encrypted file 20 and encrypted key 24 are then transmitted to the archive server at steps 116 and 118, respectively, while the master key 22 is retained at the source system 8 at step 114. Transmission may be accomplished via Internet 26, dialup connection 28, or in alternative embodiments, other means such as physical delivery of the storage medium. Encryption may be performed by any of various known methods, such as RSA, DES, and other permutations and may involve authentication and verification either through a trusted third party or mathematical methods. Such authentication and verification may involve cipher block chaining (CBC), to perform an XOR on all or part of a previous block and use the resultant value in encrypting a successive block, or checksums such as cyclic redundancy checks (CRC), MD4, and MD5, which accumulate all values in a particular block according to a mathematical formula to arrive at a value which is highly unlikely to be duplicated if data in the block is changed or lost.

Upon receipt of the encrypted file 20 and the encrypted key 24, the archive server 30 writes the encrypted file 32 to a magnetic tape 36, or other medium of long term storage which is inexpensive and which need not encompass real time access, via tape drive 34 at step 120. The encrypted key 38 is then written to a tape index disk file 40 at step 122, thereby associating the magnetic tape volume 36 with the encrypted file 32 and the encrypted key 38. In alternative embodiments, a further encryption operation may be performed at the archive server on the encrypted file 32 or the encrypted key 38 to add an additional layer of security.

Recovery of a file is accomplished by the archive server referencing the index to obtain the encrypted key and the volume of the encrypted file. The encrypted file is then retrieved from the volume, and both the encrypted file and encrypted key are transmitted back to the client. The client then recovers the file through the same two stage process used to encrypt. First, the secondary key must be recovered by decrypting the encrypted key with the master. Second, the original file may be recovered by decrypting the encrypted file with the secondary key.

Figure 3:
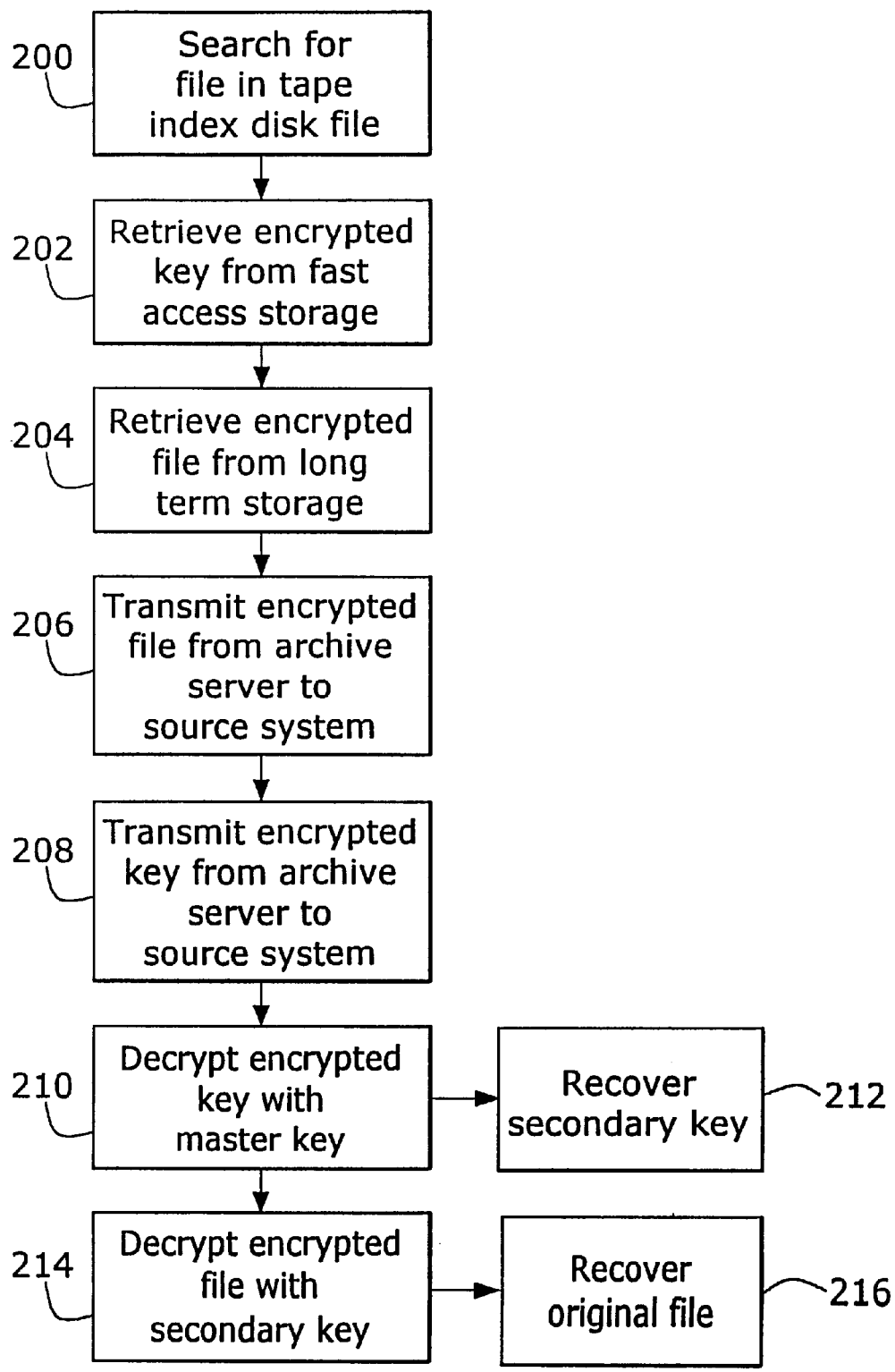
FIG. 3 is a flowchart depicting the retrieval method.

Referring to FIGS. 1 and 3, for file recovery the archive server searches the tape index disk file 40 at step 200 to lookup the encrypted key 44 and the location of the magnetic tape volume 36. The server then retrieves the encrypted key at step 202 and retrieves the encrypted file 42 from long term storage via tape drive 34, as shown in step 204. The encrypted file 48 and encrypted key 46 are then transmitted back to the source system 8 as indicated by steps 206 and 208, respectively.

Once received by the source system 8, the master key 22 is used to decrypt the encrypted key 46 at step 210 and recover the secondary key 18, as shown in step 212. The secondary key 18 is then used to decrypt the encrypted file 48 as shown in step 214 to produce the recovered file 50 which is identical to the original file 10, as indicated by step 216.

File deletion involves searching the tape index disk file 40, for the entry corresponding to the file 10 marked for deletion. Rather than retrieving the key and volume, however, the encrypted key 44 is deleted and the storage area in the tape index disk file 40 overwritten with zero values. This overwriting is required to avoid future access to the encrypted key 44 through use of a sector level disk access, as many file systems merely flag a deleted area as available, and data physically remains unaltered until a subsequent write needs the available space. Elimination of the encrypted key effectively precludes future access to the contents of the archived file stored on magnetic tape without requiring physical modification to the archive volume; only the encrypted key is deleted. Therefore, there is no compromise of the integrity of adjacent entities on the tape, and no extraneous versions of sensitive data.

Following overwrite of the encrypted key 44, the information in the encrypted file 32 remains secure. No modification of the magnetic tape volume 36 is required, as the encryption ensures that the information remains unintelligible.

Effectiveness of this method suggests that the encryption take place no more remotely than the limits of the source system organization's proprietary, or internal, network, as unprotected electronic transfers can also compromise the data. The dotted line 52 on FIG. 1 indicates the extent of unencrypted data and should represent no greater extent than the intranet of the originating entity.

Master key generation is significant because recovery of a key allows recovery of the file that the key represents. Consequently, control over access and deletion to archived files is dependent upon control over the corresponding secondary keys. Each key, however, must be unique to the file to which it corresponds, otherwise, exposure of a key to decrypt a particular file compromises that key for all other files which that key covers. If the source system is required to maintain a separate key for all archived encrypted files, however, there is merely a shift in storage medium, as the key to each encrypted file, rather than the file, must be still be maintained. Encrypting individual secondary keys allows the keys to be maintained as securely as the files. The source system maintains a single master key, or several master keys covering different groups of secondary keys. Control of the archived, encrypted files is then focused through a master key. The archiving entity retains a set of all encrypted files, and maintains a mapping to the corresponding encrypted keys for which the source organization holds the master key.

Having described the preferred embodiments of the invention, other embodiments which incorporate concepts of the invention will now become apparent to one skilled in the art. Therefore, the invention should not be viewed as limited to the disclosed embodiments but rather should be viewed as limited only by the spirit and scope of the appended claims.

What is claimed is:

1. An electronic network for transferring data units among storage elements comprising:
   a communications link;
   a source information processing system at a first end of said communications link further comprising:
      a master encryption key;
      at least one secondary encryption key;
      a first memory for storing data units and said master and said at least one secondary encryption keys; and
      an encryption engine for selectively encrypting said data units to produce encrypted data units using at least one of said secondary encryption keys, and for encrypting said at least one secondary encryption key with said master encryption key producing at least one encrypted key; and
   an archive server information processing system having at least one archive server key at a second end of said communications link comprising a second memory and in communication with said source information processing system, said archive server information processing system for receiving and storing said encrypted data units and said encrypted keys in said second memory wherein said archive server key is used to further encrypt said encrypted keys.

2. The network as in claim 1 wherein said first and said second memories provide fixation in a medium selected from the group consisting of electronic, magnetic, and optical storage media.

3. The network as in claim 1 wherein said first memory comprises a substantially real-time random access storage medium.

4. The network as in claim 1 wherein said second memory comprises a first and second storage area, said first storage area comprising substantially real-time random access storage medium, and said second storage area comprising high-volume storage wherein storage capacity and speed are not degraded by quantity of information stored thereby.

5. The network as in claim 4 wherein said high-volume storage is comprised of detachable physical volumes capable of selective and repeatable communication with said archive server information processing system.

6. The network as in claim 4 wherein said at least one encrypted key is stored in said first storage area within said second memory and said encrypted data units are stored in said second storage area within said second memory.

7. The network as in claim 1 wherein said data units comprise elements of a file system.

8. The network as in claim 1 wherein said data units comprise a discrete and enumerable area within said first memory.

9. The network as in claim 1 wherein said source information processing system further comprises a computer and said encryption engine is implemented by said computer executing an encryption application having said master encryption key, said at least one secondary key, and said data units as inputs and said encrypted data units and said at least one encrypted key as outputs.

10. The network as in claim 1 wherein said source information processing system further comprises a computer and said encryption engine is implemented by a circuit in communication with said computer, said circuit having said master encryption key, said at least one secondary encryption key, and said data units as inputs and said encrypted data units and said at least one encrypted key as outputs.

11. The network as in claim 1 further comprising a plurality of said source information processing systems electrically connected to said archive server information processing system.

12. The network as in claim 1 wherein said data units comprise subdivisions comprising a plurality of blocks and said encryption is applied to said blocks wherein input to said encryption includes values from said plurality of blocks and the results of at least one previous encrypted block.

13. An electronic network for transferring data units among storage elements comprising:
   a communications link;
   a source information processing system at a first end of said communications link further comprising:
      a master encryption key;
      at least one secondary encryption key;
      a first memory for storing data units and said master and said at least one secondary encryption keys; and
      an encryption engine for selectively encrypting said data units to produce encrypted data units using at least one of said secondary encryption keys, and for encrypting said at least one secondary encryption key with said master encryption key producing at least one encrypted key; and
   an archive server information processing system having at least one archive server key at a second end of said communications link comprising a second memory and in communication with said source information processing system, said archive server information processing system for receiving and storing said encrypted data units and said encrypted keys in said second memory wherein said archive server key is used to further encrypt said encrypted data units.

14. A method for providing secure archive for data generated in a first memory within a source information processing system comprising the steps of:

identifying data for archive within said first memory;

obtaining a secondary encryption key;

encrypting said data with said secondary encryption key to produce encrypted data;

obtaining a master encryption key;

encrypting said secondary encryption key with said master encryption key to produce an encrypted key;

transmitting said encrypted data and encrypted key to an archive information system having a second memory;

writing said encrypted data and said encrypted key to said second memory; and overwriting the portion of said second memory where said encrypted key is stored.

15. The method according to claim 14 wherein the step of transmitting comprises sending via electromagnetic medium.

16. The method according to claim 14 wherein the step of transmitting is selected from the group consisting of transmitting via electronic network communications and transmitting via dedicated telephone modem connection.

17. The method according to claim 14 wherein the step of identifying data for archive is comprised of demarcating an enumerated area within said first memory.

18. The method according to claim 14 wherein the step of identifying data in first memory comprises locating information from fixation in a medium selected from the group consisting of magnetic, electronic and optical.

19. The method according to claim 14 wherein the step of writing to second memory consists of fixation in a medium selected from the group consisting of magnetic, electronic and optical.

20. The method according to claim 14 wherein said data is subdivided into a plurality of blocks and input to said encrypting includes the results of at least one previous encrypting of said blocks.

21. A method for providing secure archive for data generated in a first memory within a source information processing system comprising the steps of:

identifying data for archive within said first memory;

obtaining a secondary encryption key;

encrypting said data with said secondary encryption key to produce encrypted data;

obtaining a master encryption key;

encrypting said secondary encryption key with said master encryption key to produce an encrypted key;

transmitting said encrypted data and encrypted key to an archive information system having a second memory and an archive server encryption key;

further encrypting said encrypted key with said archive server encryption key;

writing said encrypted data and said encrypted key to said second memory.

22. A method for providing secure archive for data generated in a first memory within a source information processing system comprising the steps of:

identifying data for archive within said first memory;

obtaining a secondary encryption key;

encrypting said data with said secondary encryption key to produce encrypted data;

obtaining a master encryption key;

encrypting said secondary encryption key with said master encryption key to produce an encrypted key;

transmitting said encrypted data and encrypted key to an archive information system having a second memory and an archive server encryption key;

further encrypting said encrypted data with said archive server encryption key;

writing said encrypted data and said encrypted key to said second memory.

23. A method for providing secure archive for data generated in a first memory within a source information processing system comprising the steps of:

identifying data for archive within said first memory;

obtaining a secondary encryption key;

encrypting said data with said secondary encryption key to produce encrypted data;

obtaining a master encryption key;

encrypting said secondary encryption key with said master encryption key to produce an encrypted key;

transmitting said encrypted data and encrypted key to an archive information system having a second memory and an archive server encryption key;

writing said encrypted data and said encrypted key to said second memory retrieving said encrypted data and said encrypted key from said second memory of said archive information system;

decrypting said encrypted key with said archive server encryption key;

transmitting said encrypted data and said encrypted key from said archive information system to said source information processing system;

decrypting said encrypted key with said master encryption key to recover said secondary key; and decrypting said encrypted data with said secondary key to recover said data.

24. A method for providing secure archive for data generated in a first memory within a source information processing system comprising the steps of:

identifying data for archive within said first memory;

obtaining a secondary encryption key;

encrypting said data with said secondary encryption key to produce encrypted data;

obtaining a master encryption key;

encrypting said secondary encryption key with said master encryption key to produce an encrypted key;

transmitting said encrypted data and encrypted key to an archive information system having a second memory and an archive server encryption key;

writing said encrypted data and said encrypted key to said second memory;

retrieving said encrypted data and said encrypted key from said second memory of said archive information system;

decrypting said encrypted data with said archive server encryption key;

transmitting said encrypted data and said encrypted key from said archive information system to said source information processing system;

decrypting said encrypted key with said master encryption key to recover said secondary key; and decrypting said encrypted data with said secondary key to recover said data.

* * * * *